(12) United States Patent
Ritzmann et al.

(10) Patent No.: US 12,311,912 B2
(45) Date of Patent: May 27, 2025

(54) METHOD AND A SYSTEM FOR CONTROLLING A VEHICLE ON A MISSION

(71) Applicant: FPT MOTORENFORSCHUNG AG, Arbon (CH)

(72) Inventors: Johannes Ritzmann, Bulach (CH); Oscar Chinellato, Tubach (CH); Georg Lins, Wallisellen (CH); Mauro Salazar, Breganzona (CH); Christopher Onder, Weisslingen (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 239 days.

(21) Appl. No.: 17/924,531

(22) PCT Filed: May 14, 2021

(86) PCT No.: PCT/IB2021/054153
§ 371 (c)(1),
(2) Date: Nov. 10, 2022

(87) PCT Pub. No.: WO2021/229526
PCT Pub. Date: Nov. 18, 2021

(65) Prior Publication Data
US 2023/0347865 A1   Nov. 2, 2023

(30) Foreign Application Priority Data
May 15, 2020   (IT) .................... 102020000011254

(51) Int. Cl.
*B60W 20/11*   (2016.01)
*B60W 10/06*   (2006.01)
(Continued)

(52) U.S. Cl.
CPC ............ *B60W 20/11* (2016.01); *B60W 10/06* (2013.01); *B60W 10/08* (2013.01); *B60W 20/16* (2016.01);
(Continued)

(58) Field of Classification Search
CPC ...... B60W 20/11; B60W 20/16; B60W 10/06; B60W 10/08; B60W 30/188; B60W 50/00;
(Continued)

(56) References Cited

U.S. PATENT DOCUMENTS

2015/0291150 A1* 10/2015 Sujan ................ B60W 30/188
                                                 180/65.265
2016/0362096 A1* 12/2016 Nikovski ........... G01C 21/3469
(Continued)

OTHER PUBLICATIONS

Murgovski et al., "Engine On/Off Control for Dimensioning Hybrid Electric Powertrains via Convex Optimization," Mar. 8, 2013 (Year: 2013).*

(Continued)

*Primary Examiner* — Dale W Hilgendorf
*Assistant Examiner* — Hana Lee
(74) *Attorney, Agent, or Firm* — Leason Ellis LLP

(57) ABSTRACT

A method for controlling a vehicle on a mission, the vehicle comprising a first and a second power source for driving the vehicle itself, wherein the first power source comprises an engine configured to generate power from fuel and an after treatment system coupled to the combustion engine, the method comprising the steps of solving a convex first optimal control problem based on a mathematical model of the vehicle, the first optimal control problem involving state variables for the after treatment system, a set of constraints, and a cost function having control variables that include a discrete variable and a continuous variable; the solving including an initial determination of the discrete variable (Continued)

and an iterative execution of minimizing the cost function after replacement of the discrete variable with respect to the continuous variable, updating the discrete variable, and verifying the satisfaction of a convergence criterion.

17 Claims, 6 Drawing Sheets

(51) Int. Cl.
  *B60W 10/08* (2006.01)
  *B60W 20/16* (2016.01)
  *B60W 30/188* (2012.01)
  *B60W 50/00* (2006.01)

(52) U.S. Cl.
  CPC .......... *B60W 30/188* (2013.01); *B60W 50/00* (2013.01); *B60W 2050/0031* (2013.01); *B60W 2510/0208* (2013.01); *B60W 2510/0638* (2013.01); *B60W 2510/0666* (2013.01); *B60W 2510/085* (2013.01); *B60W 2510/1005* (2013.01); *B60W 2510/244* (2013.01)

(58) Field of Classification Search
  CPC . B60W 2050/0031; B60W 2510/0208; B60W 2510/0638; B60W 2510/0666; B60W 2510/085; B60W 2510/1005; B60W 2510/244
  See application file for complete search history.

(56) References Cited

U.S. PATENT DOCUMENTS

| | | | |
|---|---|---|---|
| 2018/0202380 A1* | 7/2018 | Wang | F02D 41/1402 |
| 2020/0391721 A1* | 12/2020 | Wang | B60W 10/06 |
| 2022/0402476 A1* | 12/2022 | Engel | B60W 50/0097 |
| 2023/0347872 A1* | 11/2023 | Gesang | B60L 7/18 |

OTHER PUBLICATIONS

Fikar et al., "Optimal Process Control," Jul. 2, 2012 (Year: 2012).*
East et al., "Energy Management in Plug-in Hybrid Electric Vehicles: Convex Optimization Algorithms for Model Predictive Control", Feb. 20, 2019 (Year: 2019).*
Larsson et al., "Analytic Solutions to the Dynamic Programming Subproblem in Hybrid Vehicle Energy Management" Jun. 10, 2014 (Year: 2014).*
Abel et al., "Distributed Predictive Control Approach for Fuel Efficient Gear Shifting in Hybrid Electric Vehicles", Jan. 9, 2017 (Year: 2017).*
Sciarretta et al., "Control of Hybrid Electric Vehicles", Mar. 26, 2007 (Year: 2007).*
International Search Report and Written Opinion in corresponding International Patent Application No. PCT/IB2021/054153, mailed Aug. 13, 2021 (14 pages).
Tobias Nu Esch et al: 11 Convex Optimization for the Energy Management of Hybrid Electric Vehicles Considering Engine Start and Gearshift Costs, Energies, vol. 7, No. 2, Feb. 19, 2014 (Feb. 19, 2014), pp. 834-856, XP055693090, DOI: 10.3390/en7020834 paragraphs [0001]-[0004] ; figure 1.
Kessels J T B A et al: "Integrated energy & emission management for hybrid electric truck with SCR aftertreatment", A Vehicle Power and Propulsion Conference (VPPC), 2010 IEEE, IEEE, Sep. 3, 2010 (Sep. 3, 2010), pp. 1-6, XP031929126, DOI: 10.1109/VPPC.2010. 5728990 ISBN: 978-1-4244-8220-7 paragraphs [0001]-[0003]; figure 1.
Nu Esch Tobias et al: "Equivalent Consumption Minimization Strategy for the Control of Real Driving NOx Emissions of a Diesel Hybrid Electric Vehicle", Energies, M D P I AG, CH • vol. 7, No. 5 May 12, 2014 (May 12, 2014), pp. 3148-3178, XP009524543, ISSN: 1996-1073, DOI: 10.3390/EN7053148 Retrieved from the Internet: URL:http://www.mdpi.org/energies/index-200809.htm [retrieved on Dec. 11, 2020] paragraphs [0001]-[0005]; figure 1.

* cited by examiner

METHOD AND A SYSTEM FOR CONTROLLING A VEHICLE ON A MISSION

CROSS-REFERENCE TO RELATED APPLICATIONS

This patent application is a U.S. National Phase Application under 35 U.S.C. § 371 of International Patent Application No. PCT/IB2021/054153, filed on May 14, 2021, which claims priority from Italian patent application no. 102020000011254, filed on May 15, 2020, all of which are incorporated by reference, as if expressly set forth in their respective entireties herein.

TECHNICAL FIELD

The present invention concerns a method and a system for controlling a vehicle on a mission, in particular by means of optimal control inputs determined such as to minimize fuel consumption and/or pollutant emissions.

BACKGROUND OF THE INVENTION

Some vehicles are known to enjoy high flexibility properties since capable of satisfying power supply needs through the serial and/or parallel exploitation of at least one first power source and at least one second power source.

Commonly, the first power source delivers power from a first energy storage and cannot recuperate energy, whereas the second power source delivers power from a second energy storage and can provide energy to the second power source.

Usually, the first energy storage is a fuel tank and the first power source uses fuel from the fuel tank to generate energy. Typically, the first power source is an internal combustion engine, but also other sources may be considered, such as fuel cells operating on gaseous fuels.

In other possible cases, the first power source does not rely on fuel, such as when the first energy storage is represented by an overhead line and the first power source is a power converter.

On the other hand, the second power source is usually an electric motor/generator and the second energy storage is a battery.

The above vehicles are also known to be provided with control systems, which are adapted to manage optimally the split of the required power between the available power sources.

In particular, when the first and the second energy storage are a fuel tank and a battery, the control systems operate to minimize fuel consumption while fulfilling constraints on the level of charge of the battery.

Sometimes, the minimization is carried out by also taking into account constraints on the level of pollutant emissions, such as nitrogen oxide (NOx) emissions.

Some of the known control systems rely on a-priori information about missions that the vehicles have to carry out.

The term mission is here used to identify the completion of travel of a vehicle along a predetermined path or track.

Such a priori information typically includes the required speed of the vehicles and the features of the tracks to be followed, such as road gradients, surface conditions and the like.

In order to determine optimal inputs for controlling the power flows within the vehicles, the known control systems carry out optimization methods based on the construction and solution of an optimal control problem.

The latter optimal control problem is posed as a constrained minimization of a specific cost function. In particular, the cost to be minimized typically includes terms representing the overall consumed fuel.

The above terms are accurately modeled through non-linear and non-convex functions, which often depend on a high number of dynamic state variables and optimization variables.

For example, the state variables may include quantities that are indicative of the operation of the engine and/or of an after treatment system (ATS) associated to the engine.

However, in view of the complexity of the underlying models, known optimization methods are hard to be computer implemented, especially in a real-time fashion.

Indeed, the complexity of the cost function and of the constraints to be met lead to solutions of the related optimal control problem, which require heavily time-consuming computations.

Especially, the complexity is highly increased when models of an after treatment system and of pollutant emissions are considered.

Therefore, the need is felt to provide an optimization method for controlling a vehicle on a mission, which takes into account pollutant emission models and whose actual implementation on a related system requires a reduced computational effort with respect to the above mentioned optimization methods.

An aim of the present invention is to satisfy the above-mentioned need.

SUMMARY OF THE INVENTION

The aforementioned aim is achieved by a method and a system for controlling a vehicle, as claimed in the appended set of claims.

Dependent claims set out particular embodiments of the invention.

BRIEF DESCRIPTION OF DRAWINGS

For a better understanding of the present invention, preferred embodiments are described in the following, by way of non-limiting examples, with reference to the attached drawings wherein.

DETAILED DESCRIPTION OF THE INVENTION

Figure 1:
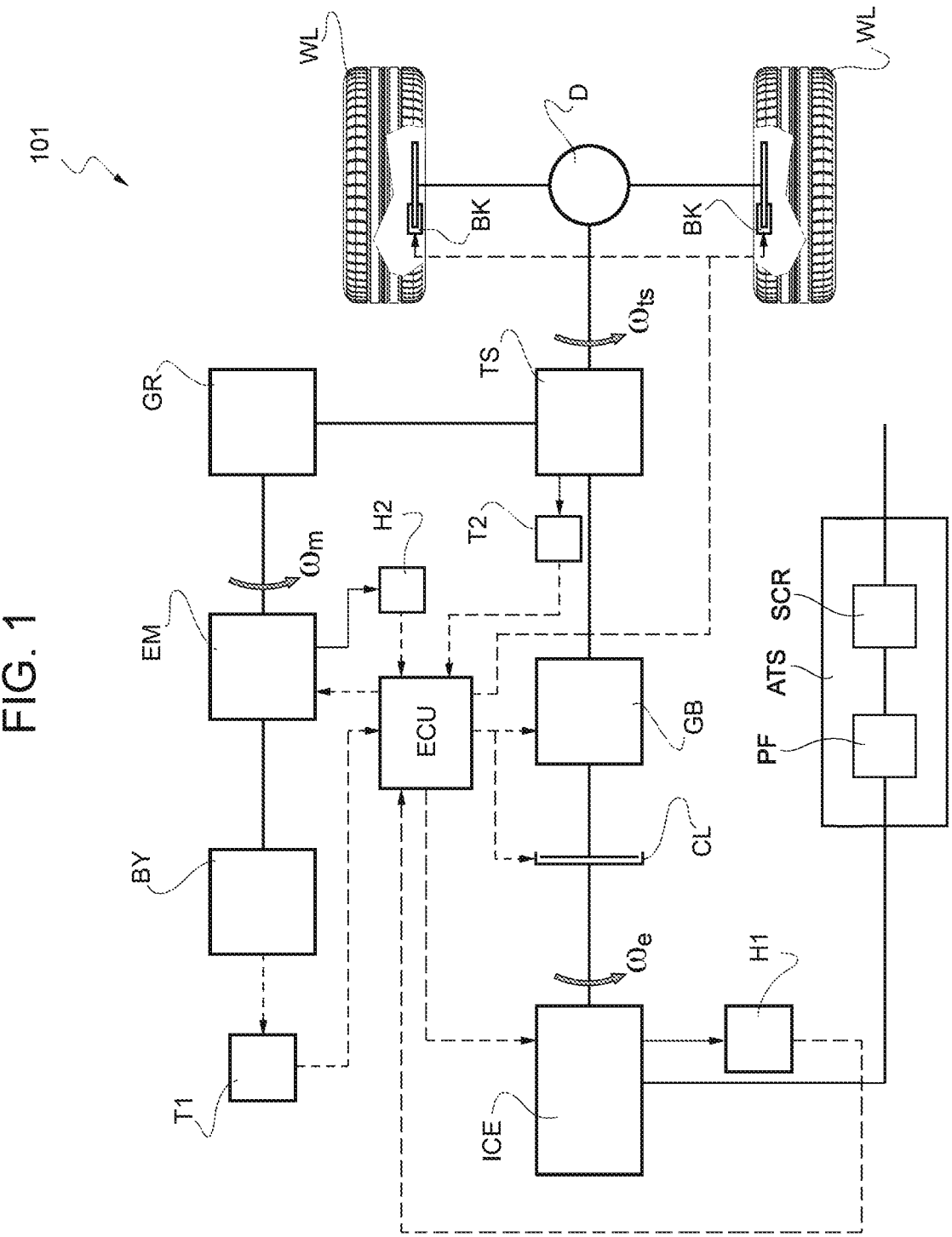
FIG. 1 illustrates schematically a vehicle comprising a system for controlling the same vehicle, according to the invention.

In FIG. 1, reference number 101 indicates a vehicle comprising a first power source or generator and a second power source or generator.

Vehicle 101 further comprises a first and a second energy storage respectively coupled to the first and the second power source and from which the latter draw energy for driving vehicle 101.

The first power source only dissipates energy from the first energy storage, whereas the second power source can provide energy to the second energy storage.

Vehicle 101 is a hybrid electric vehicle (HEV) where, in particular, the second energy storage and the second power source respectively comprise a battery BY and an electric motor EM.

On the other hand, the first energy storage and the first power source respectively comprise a fuel tank (not shown) and an engine ICE, more precisely an internal combustion engine.

Electric motor EM and battery BY are coupled to each other, for instance by means of a DC/DC converter, such that electric motor EM is supplied by power taken from batter BY.

Vehicle 101 further comprises an after treatment system ATS coupled to the engine ICE to receive exhaust gases therefrom and remove pollutants from the received exhaust gases. The after treatment system ATS is of a known kind and comprises, for example, a particulate filter PF and a catalyst for polluting gases, such as nitrogen oxides or NOx. In particular, the catalyst is defined by a selective catalytic reduction (SCR) system, more in particular supplied with a urea aqueous solution.

Vehicle 101 further comprises an axle provided with a pair of traction wheels WL and an automotive differential D, to which the traction wheels WL are coupled. The axle further comprises a pair of friction brakes BK respectively coupled to traction wheels WL to apply braking torques thereon.

Moreover, vehicle 101 comprises a torque splitter TS, which is coupled to both engine ICE and motor EM to receive respectively engine and motor power therefrom and supply accordingly the sum of the received powers in input to differential D.

In such a manner, wheels WL may be driven by both engine ICE and motor EM in a parallel fashion. In other words, vehicle 101 is a parallel-type HEV.

Although the following description will refer only to a parallel-type HEV without any loss of generality, the concepts disclosed hereinafter are readily transposable without any effort to serial-type HEVs or any other types of HEV.

Vehicle 101 further comprises a clutch CL and a gearbox GB connecting engine ICE to torque splitter TS in a selective manner. In particular, gearbox GB has a not-shown input shaft selectively drivable by engine ICE via clutch CL and a not-shown output shaft that is directly coupled to torque splitter TS.

With greater detail, gearbox GB introduces a plurality of gear ratios between engine ICE and torque splitter TS. In particular, six increasing gear ratios are considered.

In addition, vehicle 101 comprises a transmission, e.g. a gear reducer GR, that couples motor EM to torque splitter TS. Specifically, gear reducer GR introduces a fixed gear ratio between motor EM and torque splitter TS.

Moreover, vehicle 101 comprises a control unit ECU, in particular an on-board computer, which is coupled to battery BY, motor EM, gearbox GB, clutch CL, internal combustion engine ICE, torque splitter TS, and specifically also to friction brakes BK.

Control unit ECU is configured to receive and store a plurality of parameters regarding a given mission to be pursued by vehicle 101.

Based on such parameters, control unit ECU is configured to determine the power to be supplied by engine ICE and motor EM, as well as to choose gears for gearbox GB, corresponding to the respective gear ratios, in order to guarantee the mission completion, a minimized fuel consumption, and the satisfaction of one or more constraints.

Advantageously, one of the constraints regards the overall amount of mass of emitted pollutants, such as nitrogen oxides or NOx, by vehicle 101 at the end of the mission.

Control unit ECU stores the constraint above, as well with a further constraint regarding the charge level of battery BY at the end of the mission.

Furthermore, control unit ECU preferably stores more other constraints regarding physical limits of vehicle 101.

Control unit ECU receives and stores the above parameters before the start of the mission and as a function of a variable z, which is associated to the actual position of vehicle 101 after the start of the mission.

The variable z may directly represent the actual position of vehicle 101 along the track.

Otherwise, the variable z may be for instance defined by the elapsed time from the start of the mission. The elapsed time is, indeed, associated to the actual position of vehicle 101; the association holds in view of the length/shape of the track and the land speed of vehicle 101, since the latter are assumed known a-priori or estimated in view of the mission.

Hence, the variable z can take values between a given interval $[z_0\ z_f]$, where $z_0$ can be arbitrarily set to a null value and $z_f$ depends on the assumed features of the track to be followed, given the mission.

Specifically, control unit ECU receives and stores two parameters $\Gamma$, v as a function of the variable z.

Respectively, parameters $\Gamma$, v are indicative of the assumed grade of the track to be followed by vehicle 101 and of the assumed land speed that vehicle 101 should take along the same track.

In particular, parameters $\Gamma$, v are respectively defined by the above grade of the track and land speed.

Parameters $\Gamma$, v are used by control unit ECU to compute other parameters as a function of the variable z, which are useful for control unit ECU to determine the appropriate power supply for wheels WL, as it will become clearer in the following of the disclosure.

With greater detail, the following holds:

$$\omega_{ts} = v \frac{\gamma_{fd}}{r_w} \tag{2}$$

$$T_{trac,ts} = F_{trac} \frac{r_w}{\gamma_{fd}} \tag{3}$$

where $\gamma_{fd}$, $r_w$, $\omega_{ts}$, $F_{trac}$, $T_{trac,ts}$ represent respectively the transmission ratio of differential D, the radius of wheel WL, the angular rate at the output of torque splitter TS, the tangential traction force exerted by wheels WL onto the track, and the total traction torque outputted by torque splitter TS and inputted to differential D.

$\gamma_{fd}$, $r_w$ are constant values, which are stored by control unit ECU.

On the other hand $F_{trac}$ is computed by control unit ECU as a function of the parameters $\Gamma$, v, thanks to a mathematical model stored within control unit ECU.

For instance, control unit ECU stores the following mathematical model of $F_{trac}$:

$$F_{trac} = F_d(\Gamma, v) + F_m(a) + F_{br} \tag{1}$$

Where $F_d$, $F_m$, $F_{br}$ represents respectively the drag forces (e.g. aerodynamic drag, rolling resistance and uphill driving force) acting on vehicle 101, the inertial forces acting on the vehicle 101, and the braking force of brakes BK. Parameter a is the acceleration of vehicle 101 and is computed by control unit ECU as the derivative of parameter v.

Control unit ECU is configured to control the amount of power to be directly supplied by motor EM and to control the selection of the gear for gearbox GB. The above parameters, will have a role in such a control together with other parameters determined by the control unit ECU.

Control unit ECU is further configured to operate engagement and disengagement of clutch CL, such that selection of the gear is unnecessary when clutch CL is opened.

Control unit ECU performs managing of clutch CL and of gearbox GB by:
- updating at least one first variable, which is discrete and represents the engagement or disengagement status of clutch CL, as well as the selected gear; and
- generating command signals associated to the at least one first variable for accordingly operate clutch CL and gearbox GB.

Specifically, control unit ECU updates a discrete variable $i_{gb}$ to control clutch CL and gearbox GB.

In particular, discrete variable $i_{gb}$ takes integer values, each being associated to a corresponding gear, e.g. 1, 2, 3, 4, 5, 6, or associated to the disengaged status of clutch CL, e.g. 0.

Clearly, when the variable $i_{gb}$ takes values that are associated to gears, the engagement status of clutch CL is necessarily implied.

In view of the above, the first variable is indicative of an operation or driving mode of vehicle 101. Indeed, for example, the variable $i_{gb}$ equal to zero indicates that vehicle 101 operates in a fully electric mode. Moreover, the possibility of choosing the gears indirectly implies the adaptability of vehicle 101 to operate in accordance with different track conditions.

Control unit ECU manages also the supply of power to torque splitter TS by:
- updating at least one second variable, which is continuous and indicative of the power amount supplied by at least one of motor EM and engine ICE; and
- generating command signals associated to the at least one second variable for accordingly operate at least one of motor EM and engine ICE.

Specifically, control unit ECU updates a single continuous variable u to control the power supply from motor EM and from engine ICE.

In particular, the variable u is defined by a torque split here defined as:

$$u = \frac{T_{m,ts}}{T_{trac,ts}} \quad (4)$$

where $T_{m,ts}$ represents the torque provided by motor EM at torque splitter TS and $T_{trac,ts}$ represents the total traction torque outputted by torque splitter TS and inputted to differential D.

More precisely, the following holds:

$$T_{e,ts} = (1-u)T_{trac,ts}. \quad (6)$$

where $T_{e,ts}$ represents the torque provided by engine ICE at torque splitter TS.

The variable u is indicative of the instantaneous power P provided by motor EM because, on one hand, the same P is proportional to the product $T_{m,ts} \cdot \omega_{ts}$ and, on the other hand, $T_{trac,ts}$, $\omega_{ts}$ are respectively derivable through equations 2, 3, by knowing parameters $\Gamma$, v.

Indeed, control unit ECU can evaluate $T_{m,ts}$ from equation 4 and then P by multiplying the product $T_{m,ts} \cdot \omega_{ts}$ by a known proportionality constant, which is stored in control unit ECU and is substantially defined by the product of the respective efficiencies of gear reducer GR and torque splitter TS.

Control unit ECU updates the first and the second variable by solving an optimal control problem. The optimal control problem comprises the determination of a plurality of control variables, as a function of variable z, which leads to the minimization of a chosen cost function.

The control variables include the first variable and a third variable related to the second variable. The variable z is the independent variable of the optimal control problem solved by control unit ECU. Preferably, the third variable is defined by the instantaneous power P.

The cost function is determined for at least a portion of the mission and is representative of a first quantity indicative of an energy consumed by the first power source after the portion itself is completed.

More precisely, the first quantity is indicative of the fuel consumed by vehicle 101.

The cost function is a convex function in the control variables.

The constraints are expressible in mathematical terms as equations or in equations comprising functions of at least one of the control variables.

The constraints include at least one first-order dynamic constraint involving the derivative of a state variable, with respect to variable z, as a function of at least one of the control variables.

Such a state variable is indicative of the operation of the after treatment system ATS. In particular, the same state variable is indicative of an amount of mass of pollutants, more precisely of NOx, discharged in the environment due to the operation of vehicle 101. This state variable is indicated with the symbol $m_{NOx}^{tp}$ and corresponds to the overall amount of NOx emitted by engine ICE, minus the amount converted in the after treatment system ATS, in particular the selective catalyst reduction (SCR) system. This evidently clarify why variable $m_{NOx}^{tp}$ is indicative of the operation of the after treatment system ATS.

Specifically, the constraints include more first-order dynamic constraints regarding respective further state variables.

For given values of the control variables that are integer or discrete variables, each of the constraints defines a convex set of admissible values for at least one of the control variables that are continuous variables and of the state variables.

In such a manner, the optimal control problem solved by control unit ECU results in a mixed-integer convex optimization problem.

In other words, for given values of the control variables that are integer variables, the optimal control problem is convex since the domain of the admissible values of the other control variables is convex and since the cost function admits only one minimum in that domain.

According to the disclosed embodiments, the optimal control problem involves three state variables. A first state variable is defined by $m_{NOx}^{tp}$ and a third state variable is also indicative of an operation of the after treatment system ATS. Precisely, the third state variable is indicative of a temperature of the after treatment system ATS and is indicated by symbol $\vartheta_{ATS}$. Variable $m_{NOx}^{tp}$ is a function of $\vartheta_{ATS}$.

A second state variable is indicative of the energy amount available to the second power source, such that the latter can generate power for driving vehicle 101. More precisely, the energy amount is stored within the battery BY and defines the state of charge of the battery BY. Specifically, the state variable is indicative of the state of charge of the battery BY and is indicated by symbol $\xi$.

The derivative of $\xi$, with respect to z, is preferably modeled as a function of the power generated by the second power source.

More preferably, an equivalent circuit model is used such that the following holds:

$$\frac{d\xi}{dz} = -\frac{P_b}{Q_{max}V_{oc}} \tag{4a}$$

Where $P_b$ is the power drawn from battery BY, $Q_{max}$ is the maximum capacity of the battery, and $V_{oc}$ is the open-circuit voltage.

The derivative of $\vartheta_{ATS}$, with respect to z, is preferably modeled as a function of a difference between an enthalpy flow $\dot{H}_{ATS}$ from the exhaust gases to the after treatment system ATS and a heat loss $\dot{Q}$ from the after treatment system ATS to the environment.

More preferably, the following holds:

$$\frac{d\vartheta_{ATS}}{dz} = \frac{1}{m_{ATS}c_{ATS}}(\dot{H}_{ATS} - \dot{Q}) \tag{6a}$$

where $m_{ATS}$ and $c_{ATS}$ are the total mass and the specific heat capacity of the after treatment system ATS. The heat loss $\dot{Q}$ is proportional to the difference between $\vartheta_{ATS}$ and the ambient temperature $\vartheta_{amb}$, where the proportionality constant is a heat transfer coefficient $\alpha_{h1}$ multiplied to an outer surface S of the after treatment system ATS. The derivative of $m_{NOx}{}^{tp}$, with respect to z, is preferably modeled as a function $\dot{m}_{NOx}{}^{tp}$ of $\vartheta_{ATS}$ and a mass flow $\dot{m}_{NOx}{}^{eo}$ of the pollutants, specifically NOx, through the after treatment system ATS. In other words, the following holds:

$$\frac{dm_{NOx}^{tp}}{dt} = \dot{m}_{NOx}^{tp}(\vartheta_{ATS}, \dot{m}_{NOx}^{\infty}). \tag{18}$$

Therefore, equations 4a, 6a, and 18 define three dynamic constraints.

The constraints further comprise at least one first static equality constraint reflecting a mathematical model of vehicle 101, for instance comprising the mathematical model of $F_{trac}$ in equation 1. Such a first equality constraint comprises two members respectively comprising, in turn, convex functions in at least one of the first and the third variable.

Therefore, given the features of the cost function and the constraints, the optimal control problem is solvable for at least the second variable in view of the known Pontyragin's minimum principle. Control unit ECU solves the optimal control problem in view of such a principle.

In particular, the cost function comprises the integral from $z_0$ to $z_f$ of a fuel power $P_f$, which is associated to a second quantity indicative of an instantaneous power outputted by the first power source and is a function of parameters $\Gamma$, $v$, and variables $i_{gb}$, P.

Preferably, $P_f$ is modeled in the following manner:

$$P_f = \begin{cases} 0 & \text{if } i = 0 \\ \kappa_2 P_{e,ts}^2 + \kappa_1 P_{e,ts} + \kappa_0 & \text{if } i > 0 \end{cases} \tag{11}$$

where $P_{e,ts}$ represents the power supplied by engine ICE at torque splitter TS and where $\kappa_0$, $\kappa_1$, $\kappa_2$ represent coefficients depending on the output angular rate $\omega_e$ of the engine ICE.

Angular rate $\omega_e$ is proportional to $\omega_{ts}$ and the related proportionality constant is variable as a function of the selected gear of gearbox GB, i.e. of the value assumed by the discrete variable $i_{gb}$. More precisely, $\omega_{ts}$ is equal to $\omega_e$ multiplied by the gear ratio that is associated to the value of variable $i_{gb}$ and by the efficiencies of clutch CL and gearbox GB.

Control unit ECU stores three mappings respectively relating the values of $\kappa_0$, $\kappa_1$, $\kappa_2$ to values of $\omega_e$ or $\omega_{ts}$. Those mappings depend on the engine ICE and their derivation is performed experimentally, in particular by fitting experimental data with second order polynomials.

Vehicle 101 comprises a transducer H1 that is coupled to engine ICE and to control unit ECU; transducer H1 detects another quantity indicative of angular rate $\omega_e$ and generates a signal that is relative to such another quantity and received by control unit ECU for the extraction of actual values of the angular rate $\omega_e$.

Furthermore, $P_b$ is modeled in the following manner:

$$P_b = \alpha P^2 + \beta P \tag{12}$$

where $\alpha$ and $\beta$ represent coefficients depending on the output angular rate $\omega_m$ of the motor EM. $\omega_m$ is proportional to $\omega_{ts}$ and is specifically obtainable through dividing $\omega_{ts}$ by the gear ratio of gear reducer GR.

In addition, $\beta$ is further dependent by the sign of P, which may be also negative if the motor EM operates as a generator.

Therefore, $\beta$ is represented as a discontinuous function of P taking values $\beta_1$ when P is greater or equal to zero and values $\beta_2$ otherwise.

Control unit ECU stores three mappings respectively relating the values of $\alpha$, $\beta_1$, $\beta_2$ to values of $\omega_m$ or $\omega_{ts}$. Those mappings depend on the motor EM and their derivation is performed experimentally, in particular by fitting experimental data with second order polynomials.

Vehicle 101 comprises a transducer H2 that is coupled to motor EM and to control unit ECU; transducer H2 detects a further quantity indicative of angular rate $\omega_m$ and generates a signal that is relative to such further quantity and received by control unit ECU for the extraction of actual values of the angular rate $\omega_m$.

The fuel power $P_f$ explicitly depends on the third variable P, other than the first variable (variable $i_{gb}$), since the following straightforward relationship holds:

$$P_{e,ts} = P_{ts} - P \tag{5}$$

where $P_{ts}$ is the power supplied at the torque splitter, coinciding with the product of v and $F_{trac}$, including the braking power exerted by braking system BS.

The first and the third state variables, which are indicative of the operation of the after treatment system ATS, are respective functions of the power generated by engine ICE and thus of $P_{e,ts}$. More precisely, concerning $\vartheta_{ATS}$, the enthalpy flow $\dot{H}_{ATS}$ comprises a function of $P_{e,ts}$.

In particular, it holds:

$$H_{ATS} = \begin{cases} 0 & \text{if } i_{gb} = 0 \\ \delta_2 \vartheta_{ATS} + \delta_1 \cdot (P_f - P_{e,ts}) + \delta_0 & \text{if } i_{gb} > 0 \end{cases} \quad (14)$$

where $\delta_0$, $\delta_1$, $\delta_2$ represent coefficients depending on the output angular rate $\omega_e$ of the engine ICE. Control unit ECU stores three mappings respectively relating the values of $\delta_0$, $\delta_1$, $\delta_2$ to values of $\omega_e$ or $\omega_{ts}$. Those mappings depend on the engine ICE and their derivation is performed experimentally.

Concerning $m_{NOx}^{tp}$, the mass flow of pollutants $\dot{m}_{NOx}^{eo}$ comprises a function of $P_{e,ts}$. In particular, it holds:

$$\dot{m}_{NOx}^{eo} = v_2 P_f^2 + v_1 P_f \quad (15)$$

where $v_1, v_2$ represent coefficients depending on the output angular rate $\omega_e$ of the engine ICE. Control unit ECU stores two mappings respectively relating the values of $v_1, v_2$ to values of $\omega_e$ or $\omega_{ts}$. Those mappings depend on the engine ICE and their derivation is performed experimentally.

Therefore, the knowledge of $P_{e,ts}$ and $\vartheta_{ATS}$ allows the evaluation of the dynamics of the state variables.

Figure 5:
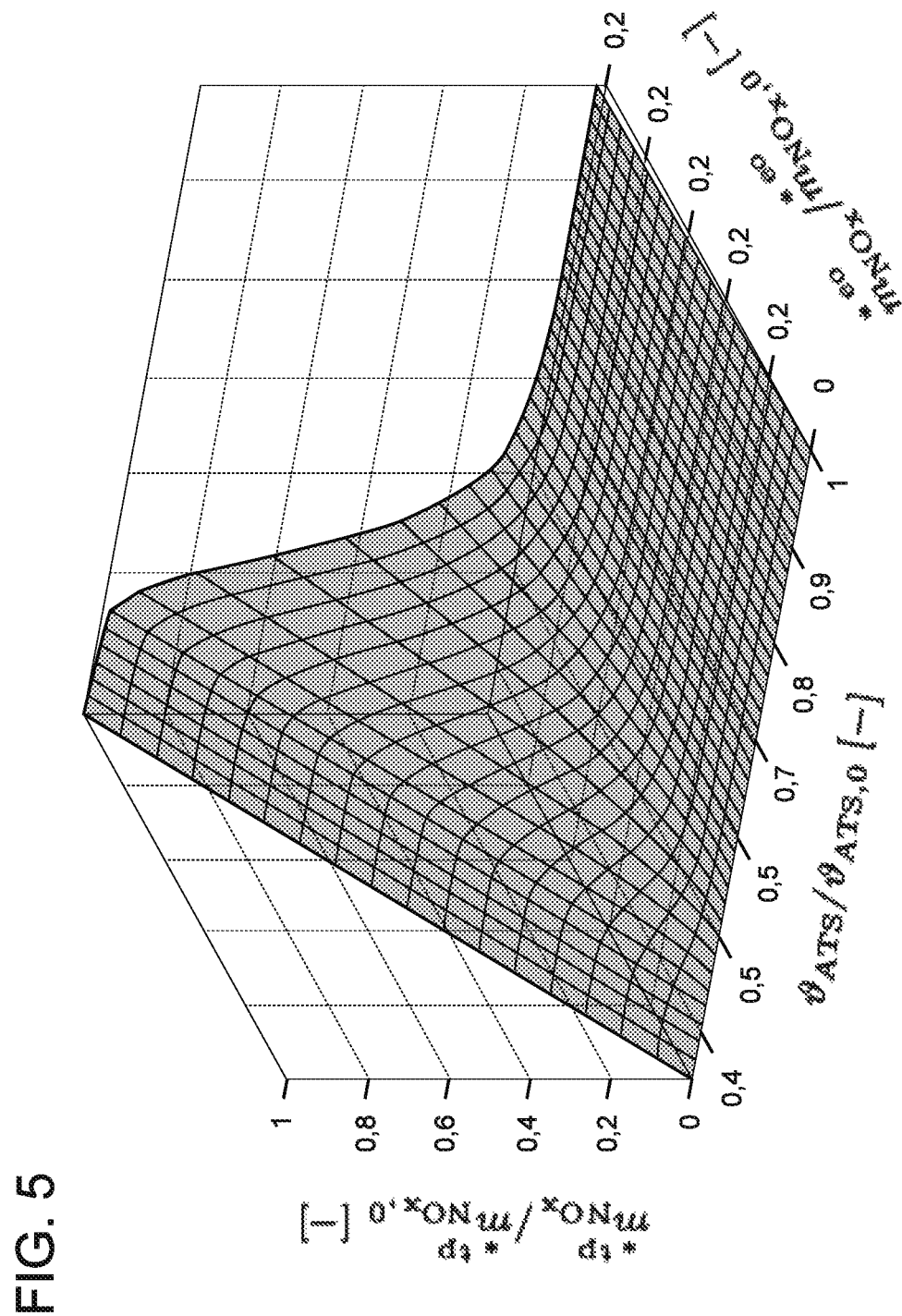
FIG. 5 is a surface chart showing a non-convex mapping between quantities involved in the method of FIG. 2.

The functional relationship of $\dot{m}_{NOx}^{tp}$ with $\vartheta_{ATS}$ and $\dot{m}_{NOx}^{eo}$, expressed by equation 18, may be identified experimentally by interpolation of data regarding the after treatment system ATS. For example, such a functional relationship may be stored in control unit ECU as a map, like the one shown in FIG. 5, derived from experiments. However, the map of FIG. 5 is non-convex and thus not suitable to constrain a convex problem. Therefore, control unit ECU stores a convex approximation of the experimental map.

Preferably, the experimental map is split into a plurality of convex regions, such that control unit ECU stores a region-wise convex map obtained in this manner.

More preferably, the convex regions include a first region defined for values of $\vartheta_{ATS}$ being lower than a first threshold $\vartheta_{thr}$, which corresponds in particular to a temperature of the after treatment system ATS that is insufficient to cause reduction of the pollutant emissions, namely NOx reduction. Therefore, in this first region, $\dot{m}_{NOx}^{tp}$ is simply equal to $\dot{m}_{NOx}^{eo}$.

The further regions are defined by values of $\vartheta_{ATS}$ being greater than the first threshold $\vartheta_{thr}$. Those further regions respectively corresponds to distinct ranges of values of $\dot{m}_{NOx}^{eo}$. The ranges do not overlap with each other but each one of the ranges is adjacent to another one of the ranges.

Figure 6:
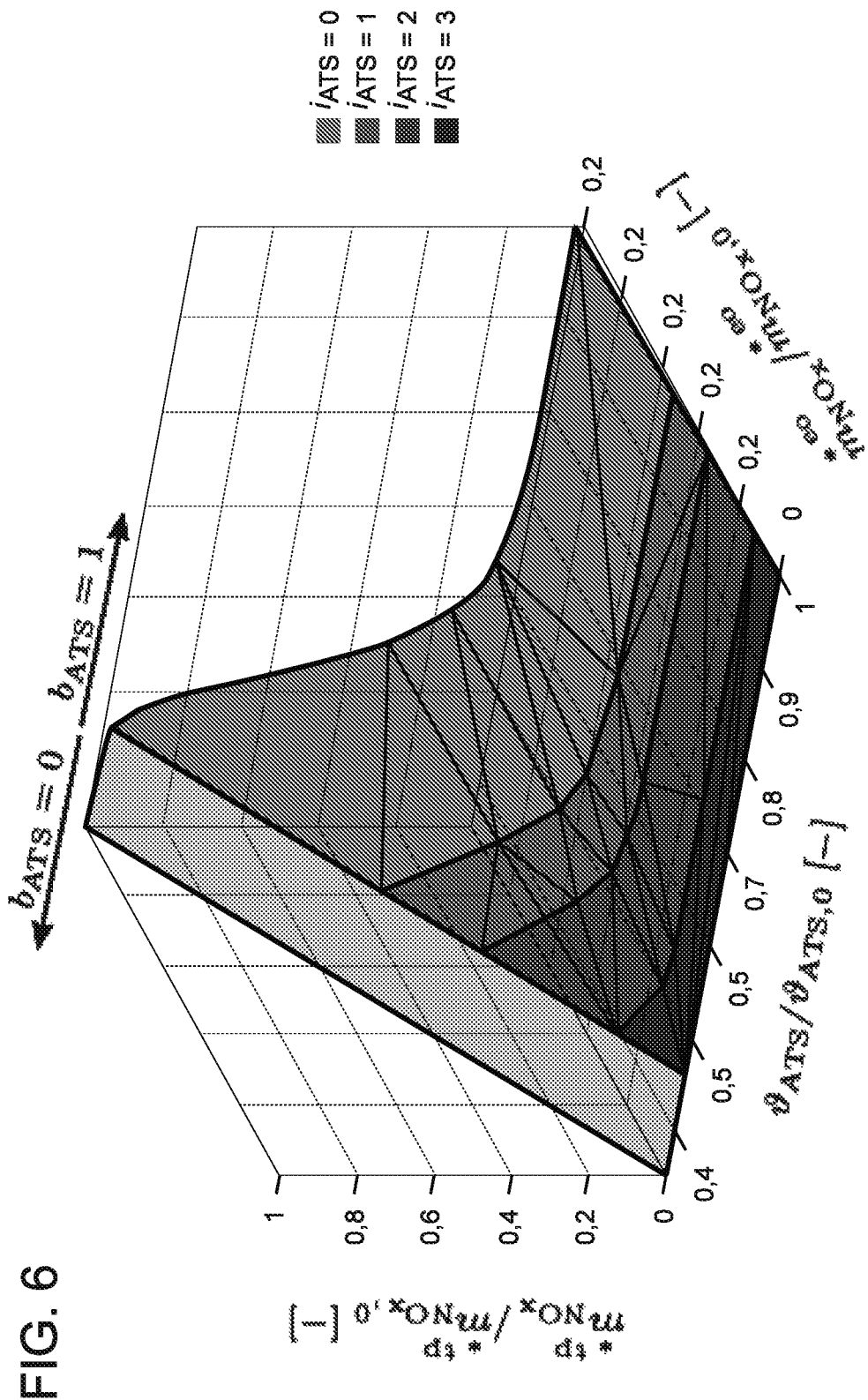
FIG. 6 is a surface chart showing a region-wise convex mapping obtained by adaptation of the mapping shown in FIG. 5.

In particular, as shown in FIG. 6, there are four further regions. FIG. 6 shows an example of the region-wise convex map stored in control unit ECU. Clearly, the total number of regions shown in FIG. 6 is five.

Each region may be identified by a couple of integer variables, such as a binary variable $b_{ATS}$ and a discrete variable $i_{ATS}$.

Specifically, binary variable $b_{ATS}$ takes a first integer value, e.g. 0, to identify the first region where no pollutant reduction occur, independently of the value taken by $i_{ATS}$, and a second integer value, e.g. 1, to identify the further regions based on $i_{ATS}$.

Similarly, discrete variable $i_{ATS}$ takes integer values, each being associated to a corresponding one of the further regions, e.g. 0, 1, 2, 3.

Preferably, each of the further regions is modeled with a set of linear functions, where each linear function has the following shape, more preferably:

$$\dot{m}_{NOx}^{tp} = \tau_2 \vartheta_{ATS} + \tau_1 \dot{m}_{NOx}^{eo} + \tau_0. \quad (16)$$

where $\tau_2$, $\tau_1$, $\tau_0$ represent the coefficients of one of the linear functions.

Conveniently, control unit ECU stores for each further region a corresponding triplet of vectors $\underline{T}_2$, $\underline{T}_1$, $\underline{T}_0$ comprising the coefficients of the linear functions for modeling the same further region.

In such a manner, each admissible value of $i_{ATS}$ corresponds to a relative triplet of vectors $\underline{T}_2$, $\underline{T}_1$, $\underline{T}_0$.

In detail, it holds:

$$\dot{m}_{NOx}^{tp} = \begin{cases} \dot{m}_{NOx}^{eo} & \text{if } b_{ATS} = 0 \\ \max(\underline{T}_2 \vartheta_{ATS} + \underline{T}_1 \dot{m}_{NOx}^{eo} + \underline{T}_0) & \text{if } b_{ATS} = 1 \end{cases} \quad (17)$$

where the vectors $\underline{T}_2$, $\underline{T}_1$, $\underline{T}_0$ depend on $i_{ATS}$. Equation 17 specifically correspond to the convex map shown in FIG. 6.

Preferably, the integer variables $b_{ATS}$, $i_{ATS}$ make part of the control variables of the optimal control problem solved by control unit ECU.

In addition to the first static equality constraint and to the dynamic constraints, the constraints of the optimal control problem may further comprise static inequality constraints that set the feasible values of variables P and $i_{gb}$, such that the physical limits of vehicle 101 are not violated.

In particular, the following expresses the static inequality constraints:

$$\omega_m \in [0, \omega_{m,max}] \quad (11j)$$

$$P \in [P_{min}(\omega_m, \xi), P_{max}(\omega_m, \xi)] \quad (11k)$$

$$\omega_e \in \begin{cases} \{0\} & \text{if } i_{gb} = 0 \\ [\omega_{e,min}, \omega_{e,max}] & \text{if } i_{gb} > 0 \end{cases} \quad (11l)$$

$$P_{e,ts} \in [0, P_{e,ts,max}(\omega_e)] \quad (11m)$$

The addition of the subscript min and max to a symbol indicates, respectively, the minimum and the maximum admissible value for the corresponding parameter, according to the physical limits of vehicle 101.

Moreover, in particular, the constraints comprise another static inequality constraint, which is specifically expressed as follows:

$$\xi(z_{fin}) \geq \xi_0 \quad (11e)$$

The latter inequality constraint imposes that the level of charge of battery BY at the end of the mission cannot be inferior to that at the beginning of the mission, indicated by $\xi_0$.

Furthermore, the constraints comprise a further static inequality constraint, which is specifically expressed as follows:

$$m_{NOx}^{tp}(z_{fin}) \leq \overline{m}_{NOx}^{tp}$$

The further constraint imposes that the level of emitted pollutant cannot be superior to a given threshold $\overline{m}_{NOx}^{tp}$ stored in the control unit ECU.

Moreover, the constraints further comprises static equality constraints to set the initial values $\xi_0$, $\vartheta_{ATS,0}$ of the state variables:

$$\xi(0) = \xi_0 \quad (11c)$$

$$\vartheta_{ATS}(0) = \vartheta_{ATS,0} \quad (11f)$$

$$m_{NOx}^{tp}(0) = 0 \quad (11g)$$

In addition, the constraints include also one or more other static inequality constraints to set the admissible values of the state variables, such as:

$$\xi \in |\xi_{min}, \xi_{max}| \qquad (11e)$$

In the disclosed embodiments, the following static model constraints are also considered in the optimal control problem:

$$P_b \geq \alpha P^2 + \beta_1 P \qquad (19e)$$

$$P_b \geq \alpha P^2 + \beta_2 P \qquad (19f)$$

$$\dot{m}_{NOx}^{eo} \geq v_2 P_f^2 + v_1 P_f \qquad (19g)$$

$$\left. \begin{array}{l} P_f = 0 \\ \dot{H}_{ATS} = 0 \end{array} \right\} \text{If } i_{gb} = 0, \qquad \begin{array}{l}(20a)\\(20b)\end{array}$$

$$\text{If } i_{gb} > 0, \begin{cases} P_f \geq \kappa_2 P_{e,ts}^2 + \kappa_1 P_{e,ts} + \kappa_0 \\ \dot{H}_{ATS} = \delta_2 \vartheta_{ATS} + \delta_1 \cdot (P_f - P_{e,ts}) + \delta_0 \end{cases} \qquad \begin{array}{l}(21a)\\(21b)\end{array}$$

$$\left. \begin{array}{l} \vartheta_{ATS} < \vartheta_{ATS,thr} \\ \dot{m}_{NOx}^{tp} = \dot{m}_{NOx}^{eo} \end{array} \right\} \text{If } b_{ATS} = 0, \qquad \begin{array}{l}(22a)\\(22b)\end{array}$$

$$\text{If } b_{ATS} = 1 \begin{cases} \vartheta_{ATS} \geq \vartheta_{ATS,thr} \\ \dot{m}_{NOx}^{eo} \geq \dot{m}_{NOx}^{eo,lb} \\ \dot{m}_{NOx}^{eo} < \dot{m}_{NOx}^{eo,ub} \\ \underline{\dot{M}}_{NOx}^{tp} \geq \underline{\mathcal{I}}_2 \vartheta_{ATS} + \underline{\mathcal{I}}_1 \dot{m}_{NOx}^{eo} + \underline{\mathcal{I}}_0 \end{cases} \qquad \begin{array}{l}(23a)\\(23b)\\(23c)\\(23d)\end{array}$$

where $\dot{m}_{NOx}^{eo,lb}$ and $\dot{m}_{NOx}^{eo,ub}$ represent the lower and an upper bound for the mass flow of emitted pollutants, namely of the active $\dot{m}_{NOx}^{eo}$ region (see FIG. 6). Moreover, $\underline{M}_{NOx}^{tp}$ is a vector of the linear functions used to model the further regions of the convex map.

Control unit ECU solves the optimal control problem under the above constraints. The solution of the optimal control problems involves the determination of optimal control variables and of optimal costates or vector of Lagrange multipliers $\underline{\lambda}$.

Here, three costates $\lambda_\xi$, $\lambda_\theta$, $\lambda_{NOX}$ are associated in particular to the three state variables $\xi$, $\vartheta_{ATS}$, $m_{NOx}^{tp}$. The costates $\lambda_\xi$, $\lambda_{NOX}$ are constant or piece-wise constant since the derivatives of $\xi$ and $m_{NOx}^{tp}$, with respect to z, do not depend on $\xi$ and $m_{NOx}^{tp}$ themselves. On the other hand, the costate $\lambda_\theta$ is time-dependent.

The optimal control problem is a mixed-integer problem, since it involves both discrete control variables, specifically variables $i_{gb}$, $i_{ATS}$, $b_{ATS}$, and continuous control variables, in particular a single variable, namely variable P. The discrete variables of the optimal control problem may be collected in a discrete vector $\underline{i}$.

Control unit ECU solves the optimal control problem in an iterative fashion. Basically, control unit ECU first solves the optimal control problem just for the continuous control variables and the costates after replacement of the discrete variables. Then, control unit ECU replaces the optimal costates on a Hamiltonian $\tilde{H}$ associated to the problem and finds the minimum thereof as a function of the control variables. Hence, the discrete variables are updated and replaced to find again and update the optimal costates. Thus, the process continuous iteratively until a convergence criterion stored in control unit ECU is satisfied.

The first replacement of the discrete variable is based on a guess or an initial determination with any known method.

When the convergence criterion becomes satisfied, control unit ECU outputs the control variables that minimize the Hamiltonian $\tilde{H}$ and the latest updated costates. In addition, control unit ECU computes and outputs the state variables according to the optimal costates and control variables. The state variables may be collected in a state vector $\underline{x}$.

In other words, the solving of the optimal control problem includes the iterative execution of:
- minimizing the cost function, after replacement of the discrete variables, with respect to the continuous variables and subject to the constraints, such that optimal costates are determined;
- updating the discrete variables based on the optimal costates determined;
- verifying the satisfaction of the convergence criterion, and
- repeating the process, based on the updated discrete variables, until the convergence criterion is satisfied.

More in detail, the update of the discrete variables involves a new minimization of the cost function by minimizing, based on Potryagin's minimum principle, the Hamiltonian $\tilde{H}$ that preferably differs from an exact Hamiltonian H of the optimal control problem, in particular by the absence of members as a function of the static constraints and by neglecting the dynamic constraints. In other words, The Hamiltonian $\tilde{H}$ is approximated with respect to the exact Hamiltonian H in the sense that it does not take into account the static constraints and the state dynamics.

The new minimization is carried out after having replaced the optimal costates in the Hamiltonian $\tilde{H}$.

Figure 3:
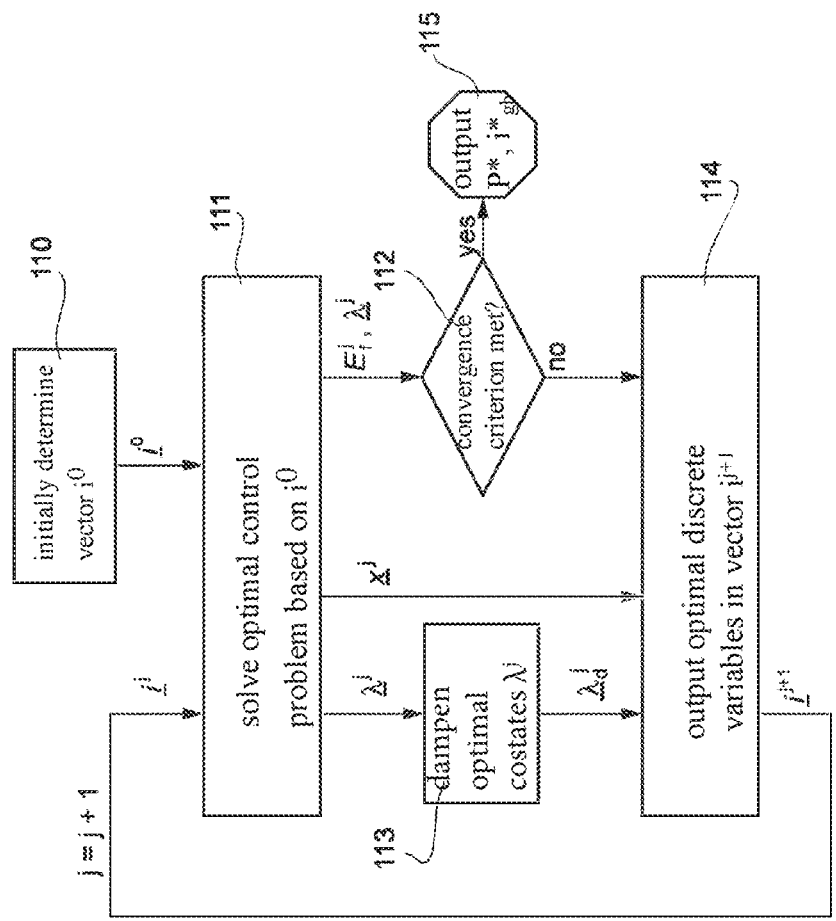
FIG. 3 is a block diagram showing a scheme of operations to carry out one step of the method of FIG. 2, according to an embodiment of the invention.

According to the embodiment of FIG. 3, the solution of the optimal control problem involves an initialization step (block 110), in which the discrete vector $\underline{i}^0$ is guessed or determined. In general, the superscript j on the discrete vector $\underline{i}^j$ indicates the number of the iterations; the null value indicates the start of the iterative operations.

For example, control unit ECU determines the discrete vector $\underline{i}^0$ by solving a further optimal control problem that involves the first variable and the third variable, without involving the other control variables and, as well, the state variables and the constraints regarding the operation of the after treatment system ATS.

More precisely, control unit ECU may implement the processes disclosed in the SAE technical paper "Fuel-optimal power split and gear selection strategies for a hybrid electric vehicle", by J. Ritzmann et al., published in 2019.

With the determination of the first and the third variable, control unit ECU determines also the other control variables by evaluating the dynamics of the state variables in a forward manner. This leads to the determination of the full discrete vector $\underline{i}^0$. Actually, $b_{ATS}$ and $i_{ATS}$ depend on $P_{et,s}$, in turn depending by P, in view of the dynamic constraints.

Once the discrete vector $\underline{i}^0$ is determined, control unit ECU solves (block 111 of FIG. 3) the optimal control problem with the discrete variables taking the values of the corresponding ones in the discrete vector $\underline{i}^0$. Here, the optimal control problem is not any more a mixed-integer problem, but it involves only continuous variables. Thus, control unit ECU implements one of the well-known methods for solving a continuous problem, such as a direct method, specifically using multiple shooting and an interior-point solver.

Block 111 of FIG. 3 outputs the costates and the state variables according to the solution of the continuous problem, preferably in the form of vectors $\underline{\lambda}^j$ and $\underline{x}^j$.

In addition, block 111 outputs also a parameter $E_f$ indicative of an overall dissipated fuel energy during the mission, in particular as a function of the integral of $P_f$ over the entire mission.

Conveniently, at block 111, the constraints active at the end of the mission, i.e. the ones of equations 11d and 11h, are replaced by soft constraints including slack variables:

$$\xi(z_{fin}) \geq \xi_0 - \epsilon_\xi \quad (25)$$

$$m_{NOx}{}^{tp}(z_{fin}) \leq \overline{m}_{NOx}{}^{tp} + \epsilon_{NOx} \quad (26)$$

where $\epsilon_\xi$, $\epsilon_{NOx}$ are the slack variables.

Correspondingly, in this case, the cost function further comprises a terminal cost, which includes a weighted sum of the slack variables:

$$w_\xi \epsilon_\xi + wNO_x \epsilon NO_x \quad (27)$$

where $w_\xi$ and $w_{NOx}$ are the weights.

Once the optimal costates are determined, control unit ECU verifies the satisfaction of the convergence criterion (block 112).

The convergence criterion may be verified as a function of one or more differences between quantities, e.g. the costates, computed at the iteration j and the same quantities at the preceding or following iteration j−1 or j+1.

For example, the convergence criterion may be satisfied when the relative increments or decrements of the quantities through the iterations are below corresponding tolerances.

Specifically, the convergence criterion is deemed satisfied by control unit ECU when at least one of the following inequations is complied:

$$\left| \frac{E_f^j - E_f^{j-1}}{E_f^j} \right| \leq 0.001 \quad (32)$$

$$\left| \frac{\lambda_\xi^j - \lambda_\xi^{j-1}}{\lambda_\xi^j} \right| \leq 0.05 \quad (33)$$

$$\left| \frac{\lambda_{NOx}^j - \lambda_{NOx}^{j-1}}{\lambda_{NOx}^j} \right| \leq 0.05 \quad (34)$$

More specifically, the convergence criterion is deemed satisfied when all the inequations above are complied.

The tolerances given in the right members of the inequations are purely exemplary without any loss of generality.

If the convergence criterion is not satisfied, control unit ECU optionally dampens the optimal costates $\underline{\lambda}^j$ (block 113). The damping is based on a damping factor $\psi$, in particular such that the damping increases with j, more in particular until a maximum damping threshold is reached.

For example, control unit ECU dampens the optimal costates $\underline{\lambda}^j$ according to the following law:

$$\underline{\lambda}_d^j = \begin{cases} \underline{\lambda}^0 & \text{if } j = 0 \\ \psi^j \underline{\lambda}^j + (1 - \psi^j) \cdot \underline{\lambda}^{j-1} & \text{if } j > 0 \end{cases} \quad (30)$$

Here, the damping factor $\psi$ is a multiplicative factor between a minimum damping value, which is greater than zero, and one. The damping factor $\psi$ decreases with j until reaching the minimum damping value.

In particular, the following holds:

$$\psi^j = \max\left(\frac{0.55}{j}, 0.07\right) \quad (31)$$

After the damping, control unit ECU replaces the optimal damped costates $\underline{\lambda}_d^j$ to the Hamiltonian $\tilde{H}$ and determines the values of P and $i_{gb}$ that minimize the same Hamiltonian $\tilde{H}$ (block 114).

In particular, the Hamiltonian $\tilde{H}$ is approximated or defined as:

$$\tilde{H} = P_f + \underline{\lambda}_d^j \begin{bmatrix} -\frac{P_b(P)}{Q_{max} V_{oc}} \\ \frac{1}{m_{ATS} c_{ATS}} \cdot \left( \dot{H}_{ATS}(P, i_{gb}, \vartheta_{ATS}^j) - \alpha_{hl} S \cdot (\vartheta_{ATS}^j - \vartheta_{amb}) \right) \\ \dot{m}_{NOx}^{tp}(\vartheta_{ATS}^j, P, i_{gb}) \end{bmatrix} \quad (29)$$

Equation 29 exemplary shows the lacking of functions, such as indicator functions, that represent constraints regarding physical limits of the vehicle 101. Such constraints are deemed indeed satisfied due to the evaluation of the optimal costates $\underline{\lambda}^j$, here damped specifically.

The Hamiltionian $\tilde{H}$ is minimized in the variables P and $i_{gb}$, whereas the integer variables $b_{ATS}$ and $i_{ATS}$ are determined by forward simulating the dynamics of the state variables based on the minimizing P and $i_{gb}$. The values for $\vartheta_{ATS}$ are provided by block 111.

Preferably, the values of P and $i_{gb}$ that minimize the Hamiltonian $\tilde{H}$ are found statically, i.e. by evaluating the Hamiltonian $\tilde{H}$ for a grid comprising all possible values of $i_{gb}$ and a plurality of quantized values for P. Alternatively, the values of P and $i_{gb}$ that minimize the Hamiltonian $\tilde{H}$ may also be found by dynamic programming or any other known optimization method. For example, this becomes expedient to guarantee a convergence when the constraints on the state of charge $\xi$ are tight.

Block 114 outputs the optimal discrete variables, in particular collected in the optimal discrete vector $\underline{i}_{j+1}$, which is used in block 111 for the next iteration of the solving.

If the convergence criterion is satisfied in block 112, the solving terminates (block 115) and the optimal control variables P*, i*$_{gb}$ and preferably i*$_{ATS}$, b*$_{ATS}$ may be outputted. As well, the corresponding state variables $\underline{x}$* and the costates $\underline{\lambda}$* may also be outputted.

Figure 4:
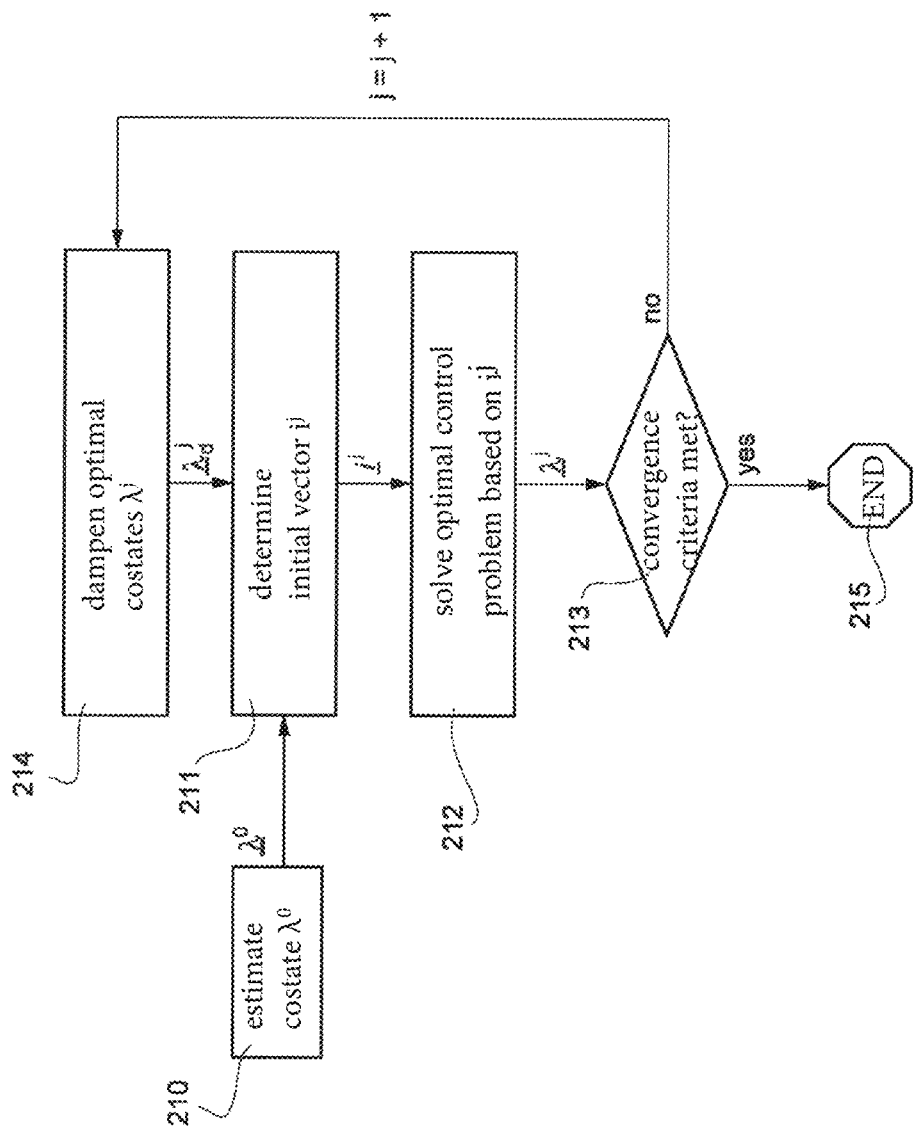
FIG. 4 is a block diagram showing a scheme of operations to carry out one step of the method of FIG. 2, according to a further embodiment of the invention.

FIG. 4 shows another embodiment for solving the optimal control problem with an iterative approach according to the invention. In block 210, control unit ECU determines or guesses the costates $\underline{\lambda}^0$. Then, control unit ECU determines the initial discrete vector $\underline{i}^0$ or $\underline{i}^j$ (j=0 here) with the knowledge of $\underline{\lambda}^0$, for example solving an optimal control problem by dynamic programming (block 211) or any other method known, such as a static optimization like in block 114. Then, with the knowledge of $\underline{i}^j$, control unit ECU executes block 212, which is equal to block 111. Thus, the outputs of the latter block 212 are optimal costates $\underline{\lambda}^j$.

Hence, control unit ECU verifies the convergence criterion in block 213 as in block 112. If the convergence criterion is not satisfied, the optimal costates $\underline{\lambda}^j$ are dampened in block 214 as in block 113. Thus, the dampened costates are provided in input to block 211 for repetition of the operations.

If the convergence criterion is satisfied, the solving is stopped in block 215 as in block 115.

After the solution of the optimal control problem is obtained, control unit ECU updates the second variable as a function of the optimal values of the third variable. In this way, the optimal values of the second variable are obtained.

In particular, it holds:

$$u^* = P^*/P_{ts} \quad (38)$$

Furthermore, the outputted state variables correspond to an optimal trajectory for third quantities indicative of the same state variables.

Figure 2:
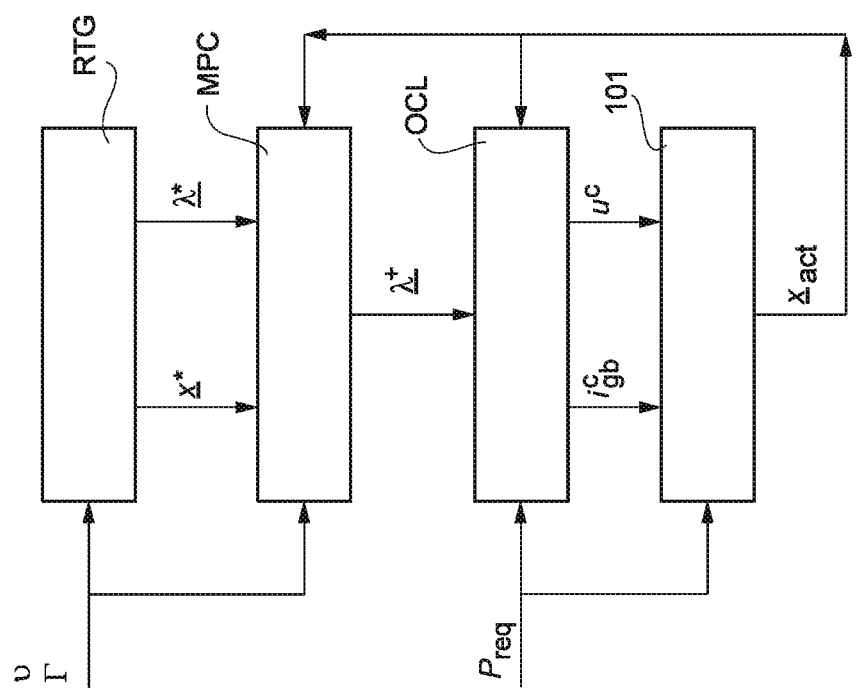
FIG. 2 is a block diagram showing a scheme of a method for controlling the vehicle of FIG. 1, according to the invention.

Control unit ECU implements the method outlined in FIG. 2, which is essentially based on the solution of the optimal control problem, in particular as already disclosed in detail, in order to control vehicle 101 during the mission.

Control unit ECU comprises a first logic block RTG or a reference trajectory generator, which outputs the optimal trajectory $\underline{x}^*$ starting from parameters $\Gamma$, $\nu$ as inputs. With greater detail, the first logic block RTG solves the optimal control problem for the whole mission in the manner disclosed above in detail.

In particular, the first logic block RTG solves the optimal control problem to evaluate the optimal costates $\underline{\lambda}^*$.

The operation of the first logic block RTG is only based on a-priori information about the mission to be pursued by vehicle 101. Indeed, the only required inputs are the a-priori known parameters $\Gamma$, $\nu$ stored by control unit ECU.

In principle, the first block RTG can also compute the optimal torque split u* according to equation 38 and, accordingly, output the same optimal torque split u* and the optimal discrete variable $i^*_{gb}$.

According to a not-shown embodiment, the outputted u* and $i^*_{gb}$ are used by control unit ECU to control motor EM and engine ICE on one hand and clutch CL and gearbox GB on the other hand. In such a case, vehicle 101 would be open-loop controlled.

Vehicle 101 further comprises a transducer device T1 coupled to battery BY and to control unit ECU. Transducer device T1 is configured to detect actual values of the third quantities indicative of the state variables and to generate a signal related to the detected values.

Control unit ECU receives the signal generated by transducer device T1 and extracts from the signal, for each value of the variable z, corresponding actual values $\underline{x}_{act}$ associated to the actual state variables.

Control unit ECU additionally comprises a second logic block MPC or a model predictive controller, which receives the actual value $\underline{x}_{act}$, the parameters $\Gamma$, $\nu$, and the reference trajectory $\underline{x}^*$ as inputs so as to determine an updated reference trajectory $\underline{x}^+$ and updated optimal costates $\underline{\lambda}^+$.

Hereinafter, the superscript $^+$ has a similar meaning to that of the superscript * and refers to variables updated by the second logic block MPC. All the above-disclosed equations apply also to optimal and updated variables by trivially considering the appropriate superscripts.

The second logic block MPC repeatedly solves the optimal control problem for a moving interval of the variable z. The moving interval starts with the actual value of z, corresponding to the actual values $\underline{x}_{act}$, and has a given size inferior than that of the entire interval related to the whole mission.

Specifically, the second logic block MPC repeatedly solves a problem that differs from that of the first logic block RTG for the interval of z or prediction horizon.

Moreover, the problem solved by the second logic block MPC differs from that of the first logic block RTG in the initial value set for the state variables, which corresponds to the actual values $\underline{x}_{act}$.

The size of the prediction horizon should be chosen in order to allow effective control of vehicle 101. Indeed, the greater is the size of the prediction horizon, the longer is the computational time for the second logic block MPC to update the outputs.

In the case the variable z represents the distance traveled by vehicle along the track, the minimum selectable size of the prediction horizon should be the maximal driving distance that the vehicle 101 can achieve during the updating time.

Moreover, the second logic block MPC evaluates also updated variables $P^+$, $i^+$, according to the above disclosure or, more specifically, according to the iterative approach of FIG. 3 or FIG. 4.

Similarly to first logic block RTG, the second logic block MPC computes the updated trajectory $\underline{x}^+$ and outputs the the updated $\underline{\lambda}^+$.

the second logic block MPC computes also an updated torque split $u^+$ according to equation 38 and an updated discrete variable $i_{gb}^+$, which may possibly be outputted and used in replacement of the optimal torque split u* and the optimal discrete variable $i^*_{gb}$, according to a not-shown embodiment.

According to the latter not-shown embodiment, the outputted $u^+$ and $i_{gb}^+$ are used by control unit ECU to control motor EM and engine ICE on one hand and clutch CL and gearbox GB on the other hand. In such a case, vehicle 101 would be closed-loop controlled.

vehicle 101 further comprises another transducer device T2 coupled to control unit ECU and configured to detect a fourth quantity indicative of the total power required at torque splitter TS and to generate a signal related to the latter fourth quantity. For example, transducer device T2 is coupled to an accelerator (not shown) of vehicle 101; alternatively, transducer device T2 is coupled to the torque splitter TS.

Control unit ECU receives the signal generated by transducer device T2 and extracts from the signal, for each value of the variable z, a corresponding actual value $P_{req}$ associated to the actual total power required at torque splitter TS.

Control unit ECU comprises a third logic block OCL or an optimal controller, which receives the updated costates $\underline{\lambda}^+$ and the actual value $P_{req}$ as inputs to output updated optimal controls $i_{gb}^c$, $u^c$.

More precisely, the third logic block OCL uses the input $\underline{\lambda}^+$ and $P_{req}$ as the costates and the required power, respectively, to solve the optimal control problem.

In particular, the third logic block OCL solves the optimal control problem by minimizing the Hamiltionian H after having replaced the costates with $\underline{\lambda}^+$ and while considering $P_{ts}$ equal to $P_{req}$ instead of a function of $\Gamma$ and $\nu$.

The results of the solution are the optimal controls $i_{gb}^c$, $u^c$, which are used by control unit ECU as the optimal updated first and second variable to control motor EM and engine ICE on one hand and clutch CL and gearbox GB on the other hand.

The above control unit ECU and the transducer devices T1, T2 make part of a system for controlling vehicle 101.

The logic blocks RTG, MPC, OCL define a multilayered control structure.

In view of the foregoing, the advantages of the method and the system for controlling vehicle 101, according to the invention, are apparent.

In particular, the disclosed method is computationally inexpensive, especially in respect to known methods, and the disclosed system can implement the disclosed method in a real-time fashion.

The control accuracy is at least comparable to that of the known method, although the implementation is significantly faster.

Especially, the disclosed multilayered control structure allows the mixing of a-priori known information with real-time information for an optimal control of the vehicle 101 with an improved effectiveness, with respect to the known methods.

The disclosed method and system allows to control not only the power split between motor EM and engine ICE, but also the amount of emitted pollutant via the introduction of state variables related to the operation of the after treatment system ATS.

The dynamics of these state variables is modeled in a simple fashion with convex functions, which renders the optimal control problem solvable in reasonable time and guarantees that the identified optimum is the global optimum.

The approximation of the above dynamics leads to the introduction of discrete variables in the cost function of the optimal control problem, which is fully manageable according to the disclosed solution of the same problem.

According to the embodiment of FIG. 3, such solution involves just two essential passages, namely the solution of a problem involving only continuous variables and a static optimization problem. Both the passages are easy to be completed in a simple manner and without significant computational effort.

The damping of the costates allows the avoidance of oscillations over the iterations of the method; in particular, the choice of an increasing damping with the iterations allows, on one hand, a fast convergence during the earlier iterations and, on the other hand, the avoidance of undesired oscillations around the optimum.

The usage of the generic variable z, possibly representing the distance traveled by vehicle 101 along the track, instead of time, allows to reduce the dynamic influence of the disturbances onto the control of vehicle 101.

Finally, the chosen constraints allow an easy solution of the optimal control problem.

It is clear that modifications can be made to the described method and system, which do not extend beyond the scope of protection defined by the claims For example, the numeral adjectives are purely conventional; in particular, the third and the second variable may coincide each other. In other words, the optimal power P* may be directly used to control vehicle 101.

Electric motor EM is an example of the second power source of vehicle 101. Therefore, electric motor EM may be more generally replaced by a different power source with appropriate straightforward adaptations.

For instance, the electric motor EM may be replaced by a converter configured to draw energy from an overhead line. In such a case, the parameters, quantities and variables related to motor EM and battery BY have to be replaced with corresponding parameters, quantities and variables related to the converter and the overhead line.

Moreover, the internal combustion engine ICE may be replaced by a fuel cell running on gaseous fuel or other kinds of fuel power source.

The gear reducer GR may also introduce a plurality of gear ratios; in that case, the presence of further gear ratios may be taken into account by the possible values of the variable $i_{gb}$.

Brakes BK may be only emergency brakes and remain always inactive during normal operation of vehicle 101; in such a case the mathematical models of vehicle 101 have to be revised accordingly.

Instead of requiring charge-sustaining operation, equation 11d could be rewritten to aim for a predetermined state of charge of battery BY differing from the initial one. This is especially promising for plug-in hybrid vehicles, where it is desirable to deplete the battery BY over a mission, as it can be recharged using power from an electricity grid at the destination.

Eventually, the optimal control problem may involve only one constraint forming a set of constraints with just one element. Similarly, the problem may involve only one state variable forming a set of state variables with just one element. More in general, a set includes one or more members.

The invention claimed is:

1. A method for controlling a vehicle (101) on a mission, the vehicle (101) comprising a first and a second power source (ICE, EM) for driving the vehicle (101) itself, wherein the first power source comprises a heat engine (ICE) configured to generate power from fuel and an after treatment system (ATS) coupled to the engine (ICE),
the method comprising the steps of:
solving a convex first optimal control problem based on a mathematical model of the vehicle (101), said first optimal control problem involving a set of state variables ($\xi$, $\vartheta_{ATS}$, $m_{NOx}^{tp}$), a set of constraints, and a cost function having control variables (P, $i_{gb}$, $i_{ATS}$, $b_{ATS}$) that include at least one discrete variable ($i_{gb}$, $i_{ATS}$, $b_{ATS}$) and at least one continuous variable (P),
the solving including an initial determination or guess (110; 210, 211) of the at least one discrete variable ($i_{gb}$, $i_{ATS}$, $b_{ATS}$) and an iterative execution of
a) minimizing (111; 212) the cost function, after replacement of the at least one discrete variable, with respect to the at least one continuous variable (P) and subject to the set of constraints, based on a determination of a set of optimal costate variables ($\lambda_\xi$, $\lambda_\vartheta$, $\lambda_{NOx}$) associated to the set of state variables ($\xi$, $\vartheta_{ATS}$, $m_{NOx}^{tp}$);
b) updating (114; 211) the at least one discrete variable ($i_{gb}$, $i_{ATS}$, $b_{ATS}$) based on the determined set of optimal costates in step a);
c) verifying (112; 212) the satisfaction of a convergence criterion based on a result of step a), and
d) repeating step a) based on the updating of step b) if the convergence criterion is not satisfied or exiting from the iterative execution otherwise, and
controlling the vehicle (101) based on the solution of said first optimal control problem,
wherein said set of state variables ($\xi$, $\vartheta_{ATS}$, $m_{NOx}^{tp}$) includes a first state variable ($m_{NOx}^{tp}$) indicative of an operation of the after treatment system (ATS), a second state variable ($\xi$) indicative of a state of a charge of a battery, and a third state variable ($\vartheta_{ATS}$), indicative of a temperature of the after treatment system;
wherein said control variables include a first discrete variable ($i_{gb}$) indicative of an operative mode of the vehicle (101), a second discrete variable ($i_{ATS}$), a binary value ($b_{ATS}$) indicative of either a region which no pollution reduction occurs regardless of a value of the second discrete variable ($i_{ATS}$), or further regions, wherein each value of the second discrete variable ($i_{ATS}$) identifies one of the further regions, and a first continuous variable indicative of a power (P) supplied by at least one of said first and second power source (ICE, EM);

and wherein the cost function is determined for at least a part of the mission and is representative of a first quantity indicative of an energy consumed ($E_f$) by the first power source (ICE) after said part of the mission is completed;

said set of constraints comprising at least one end-point constraint on the admissible values that the first state variable ($m_{NOx}^{tp}$) can take at the end of said part of the mission.

2. The method of claim 1, wherein the step b) includes e) minimizing the cost function again, with respect to the control variables, based on Pontryagin's minimum principle and on minimization of a Hamiltonian function ($\tilde{H}$) having a set of costate variables replaced as a function of the set of optimal costate variables;

wherein the Hamiltonian function ($\tilde{H}$) is associated to a convex second optimal control problem involving said set of state variables ($\xi$, $\vartheta_{ATS}$, $m_{NOx}^{tp}$) and said cost function, wherein the updating of the at least one discrete variable ($i_{gb}$, $i_{ATS}$, $b_{ATS}$) is based on the result of the step e).

3. The method of claim 1, wherein the set of optimal costate variables is damped based on a damping factor ($\psi$), such that the damping increases with the number of recursions of step a) until a maximum damping threshold is reached.

4. The method of claim 1, wherein the at least one end-point constraint is defined by a soft constraint or includes at least one slack variable ($\in_\xi$, $\in_{NOx}$) to be added to the cost function with a corresponding weight.

5. The method of claim 1, wherein the first discrete variable takes one among: a first value associated to a disengagement status of a clutch (CL) of the vehicle (101); and a plurality of second values associated to respective selectable gears of a gearbox (GB) of the vehicle (101).

6. The method of claim 1, wherein the set of state variables ($\xi$, $\vartheta_{ATS}$, $m_{NOx}^{tp}$) includes a second state variable ($\xi$) indicative of an energy amount available to said second power source for the generation of a power ($P_b$) for driving the vehicle (101);

a total derivative of the second state variable ($\xi$), with respect to an independent variable (z) of the first optimal control problem, being a function of the power ($P_b$) generated by the second power source.

7. The method of claim 1, wherein the set of constraints further comprises one or more inequality constraints, which express physical limits of the vehicle (101).

8. The method of claim 7, wherein the Hamiltonian function ($\tilde{H}$) is not affected by said one or more inequality constraints.

9. The method of claim 1, wherein the mathematical model comprises a plurality of a priori known first parameters ($\Gamma$, $\nu$) associated to said mission, the mathematical model allowing the determination of a second quantity ($P_f$), which is indicative of an instantaneous power outputted by the first power source, as a function of the first parameters ($\Gamma$, $\nu$), said first discrete variable and said first continuous variable (P), and wherein said first quantity indicative of said energy consumed by the first power source (ICE) is a function of said second quantity ($P_f$).

10. The method of claim 9, wherein said first quantity and said second quantity are respectively indicative of the fuel consumed by the vehicle (101) and of an instantaneous fuel power.

11. The method of claim 10, wherein said mathematical model comprises:

a fuel-power model for which said second quantity ($P_f$) is modeled as a polynomial in a second parameter, indicative of a driving power ($P_{e,ts}$) supplied by said engine (ICE), with coefficients ($\kappa_0$, $\kappa_1$, $\kappa_2$) depending on an output angular rate ($\omega_e$) of said engine (ICE);

an engine-power model for which said second parameter is modeled as a function of said continuous variable (P) and of a third parameter, indicative of a total driving power ($P_{req}$) requested for driving the vehicle (101); and a driving-power model for which said third parameter is modeled as a function of a driving resistance for the vehicle (101), the driving resistance depending on said first parameters ($\Gamma$, $\nu$).

12. The method of claim 9, wherein the first state variable ($m_{NOx}^{tp}$) is indicative of an accumulated mass of pollutants by the after treatment system (ATS) and wherein the set of state variables ($\xi$, $\vartheta_{ATS}$, $m_{NOx}^{tp}$) further includes a third state variable ($\vartheta_{ATS}$) indicative of a temperature of the after treatment system (ATS);

a total derivative of the first state variable ($m_{NOx}^{tp}$), with respect to the independent variable (z), being a function of the third state variable ($\vartheta_{ATS}$) and of a mass flow ($\dot{m}_{NOx}^{eo}$) of said pollutants, wherein said mass flow ($\dot{m}_{NOx}^{eo}$) is modeled as a polynomial function of the second quantity ($P_f$), with coefficients depending on an output angular rate ($\omega_e$) of said engine (ICE).

13. The method of claim 12, wherein said function of the third state variable ($\vartheta_{ATS}$) and of the mass flow ($\dot{m}_{NOx}^{eo}$) defines a mapping that associates a couple of values of the third state variable ($\vartheta_{ATS}$) and of the mass flow ($\dot{m}_{NOx}^{eo}$) to a value of the first state variable ($m_{NOx}^{tp}$), said mapping being divided into a plurality of sub-regions that are each modeled with one or more linear functions and identified by a couple of variables defined by a first integer variable and a second integer variables ($i_{ATS}$, $b_{ATS}$), the first integer ($b_{ATS}$) variable taking values defining respective separated ranges for the third state variable ($\vartheta_{ATS}$), the second integer variable ($i_{ATS}$) taking values defining respective separated ranges for the mass flow ($\dot{m}_{NOx}^{eo}$), wherein the control variables include said first and second integer variables as a second and third discrete variable.

14. The method of claim 13, wherein a total derivative of the third state variable ($\vartheta_{ATS}$), with respect to the independent variable (z), is a function of a difference between an enthalpy flow ($\dot{H}_{ATS}$) from exhaust gases of the engine (ICE) to the after treatment system (ATS) and a heat loss ($\dot{Q}$) from the after treatment system (ATS) to an environment outside the vehicle (101), wherein the enthalpy flow ($\dot{H}_{ATS}$) is modeled as a linear function of the third state variable ($\vartheta_{ATS}$) and of the second quantity ($P_f$), with coefficients that depend on the output angular rate ($\omega_e$), and wherein the heat loss ($\dot{Q}$) is modeled as a linear function of the third state variable ($\vartheta_{ATS}$).

15. The method of claim 1, further comprising the steps of:
  determining a set of optimal state variables ($\underline{x}^*$) in accordance with the solution of the first optimal control problem; and
  generating a reference trajectory for a set of third quantities related to said set of optimal state variables ($\underline{x}^*$).

16. The method of claim 15, further comprising the steps of:
  acquiring a set of actual current values ($\underline{x}_{act}$) of said set of third quantities;
  solving a convex third optimal control problem based on said mathematical model and involving said set of state variables ($\xi$, $\vartheta_{ATS}$, $m_{NOx}^{tp}$), said set of constraints, a further constraint imposing the set of state variables ($\xi$, $\vartheta_{ATS}$, $m_{NOx}^{tp}$) to initially correspond to said set of current actual values ($\underline{x}_{act}$), and a further cost function having said control variables;
  updating said set of optimal costate variables in accordance with the solution of the third optimal control problem; and
  wherein said third optimal control problem comprises the iterative execution of the steps a)-d) using the further cost function instead of the cost function;
  wherein the further cost function is determined for a reduced portion of said part of the mission and is representative of said first quantity.

17. A system for controlling a vehicle (101) on a mission, the vehicle (101) comprising a first and a second power source (ICE, EM) for driving the vehicle (101) itself;
  the system comprising a control unit (ECU) programmed to implement the method of claim 1.

* * * * *